(12) United States Patent
Gong

(10) Patent No.: US 9,682,877 B2
(45) Date of Patent: Jun. 20, 2017

(54) DECHLORINATION METHOD AND SOLUTION

(71) Applicant: Terry Gong, Moraga, CA (US)

(72) Inventor: Terry Gong, Moraga, CA (US)

(73) Assignee: Earth Renaissance Technologies, LLC, Salt Lake City, UT (US)

(*) Notice: Subject to any disclaimer, the term of this patent is extended or adjusted under 35 U.S.C. 154(b) by 109 days.

(21) Appl. No.: 14/280,172

(22) Filed: May 16, 2014

(65) Prior Publication Data
US 2015/0329388 A1 Nov. 19, 2015

(51) Int. Cl.
*C02F 1/66* (2006.01)
*C02F 1/68* (2006.01)
*C02F 1/70* (2006.01)
*C02F 101/12* (2006.01)

(52) U.S. Cl.
CPC .......... *C02F 1/70* (2013.01); *C02F 1/68* (2013.01); *C02F 1/66* (2013.01); *C02F 2101/12* (2013.01); *C02F 2209/001* (2013.01); *C02F 2209/06* (2013.01); *C02F 2209/29* (2013.01); *C02F 2303/185* (2013.01); *C02F 2305/00* (2013.01)

(58) Field of Classification Search
CPC ...... C02F 1/66; C02F 1/68; C02F 1/70; C02F 1/76; C02F 2101/12; C02F 2209/06; C02F 2303/18; C02F 2303/185; C02F 2305/00; C02F 2209/001; C02F 2209/29
See application file for complete search history.

(56) References Cited

U.S. PATENT DOCUMENTS

| | | | |
|---|---|---|---|
| 2005/0011820 A1* | 1/2005 | Webb | C02F 1/008 210/192 |
| 2008/0149485 A1* | 6/2008 | Childers | C02F 1/70 204/555 |
| 2013/0048566 A1* | 2/2013 | Theordore | C02F 1/70 210/662 |

OTHER PUBLICATIONS

"Wastewater Technology Fact Sheet Dechlorination", EPA 832-F-00-022, Sep. 2000, United States Environmental Protection Agency, Office of Water, Washington, D.C.

* cited by examiner

Primary Examiner — Lucas Stelling
(74) Attorney, Agent, or Firm — Marcus G. Theodore

(57) ABSTRACT

An improved sulfurous acid dechlorination method of chlorinated waters to increase sulfites, prevent $SO_2$ gassing off, and off-setting monovalent chlorides in the treated water for land application.

3 Claims, 1 Drawing Sheet

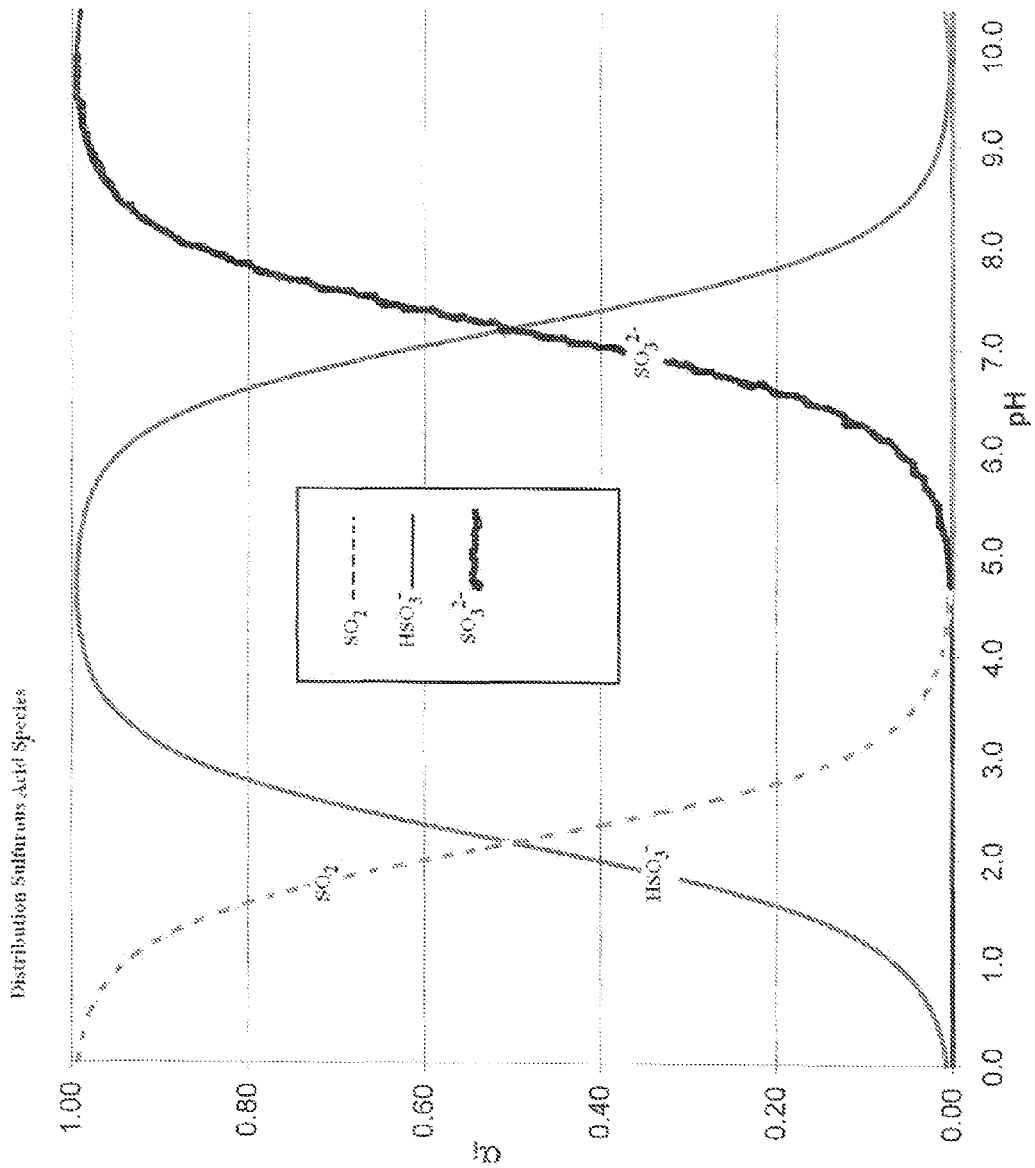

DECHLORINATION METHOD AND SOLUTION

RELATED APPLICATIONS

This application claims the benefit of U.S. provisional Patent Application entitled "Dechlorination Method and Solution", Ser. No. 61/825,003 filed May 16, 2013.

BACKGROUND OF THE INVENTION

Field

This invention pertains to dechlorination. In particular it pertains to an improved sulfurous acid dechlorination method of chlorinated waters to increase sulfites, prevent $SO_2$ gassing off, and off-setting monovalent chlorides in the treated water for land application.

State of the Art

As stated in EPA 832-F-00-022, September 2000 article entitled "Wastewater Technology Fact Sheet Dechlorination"; Dechlorination is the process of removing residual chlorine from disinfected wastewater prior to discharge into the environment. Sulfur dioxide is most commonly used for dechlorination and is the major focus of this fact sheet. Some dechlorination alternatives include carbon adsorption, sodium metabisulfite, sodium bisulfite, and hydrogen peroxide. Sodium metabisulfite and sodium bisulfite are mainly used in small facilities because these materials are more difficult to control compared to sulfur dioxide. Hydrogen peroxide is not frequently used because it is dangerous to handle (WEF, 1996).

APPLICABILITY

Chlorination has been used widely to disinfect wastewater prior to discharge since passage of the 1972 Federal Water Pollution Control Act (WPCA), (Finger et al., 1985). In the first years following the WPCA, disinfected wastewater with significant levels of residual chlorine was routinely discharged into the receiving waters. It became clear, however, that residual chlorine is toxic to many kinds of aquatic life (see, for example, Mattice and Zittel, 1976, and Brungs, 1973). Moreover, the reaction of chlorine with organic materials in the water formed carcinogenic trihalomethanes and organochlorines (WEF and ASCE, 1991). As a result, dechlorination was instituted to remove residual chlorine from wastewater prior to discharge into sensitive aquatic waters. Dechlorination minimizes the effect of potentially toxic disinfection byproducts by removing the (tee or total combined chlorine residual remaining after chlorination. Typically, dechlorination is accomplished by adding sulfur dioxide or sulfite salts (i.e., sodium sulfite, sodium bisulfite, or sodium metabisulfite). Carbon adsorption is also an effective dechlorination method, but is expensive compared to other methods. Carbon adsorption is usually implemented when total dechlorination is desired.

Specific design criteria and monitoring requirements for a particular region are determined by the state regulatory agency. Typically, the treatment plant's National Pollutant Discharge Elimination System (NPDES) permit limits effluent chlorine residual and toxicity. Currently, many permits require very low or "non-detect" chlorine residuals, making dechlorination critical.

One important alternative to dechlorination is to achieve disinfection without the use of chlorine. Other means of disinfection, such as ozone or ultraviolet disinfection, have also become increasingly prevalent (U.S. EPA. 1986; Blatchley, E. R. III, et at, 1996).

ADVANTAGES AND DISADVANTAGES

Advantages
Protects aquatic life from toxic effects of residual chlorine.
Prevents formation of harmful chlorinated compounds in drinking water through reaction of residual chlorine with water-born organic materials.

Disadvantages
Chemical dechlorination can be difficult to control when near zero levels of residual chlorine are required.
Significant overdosing of sulfite can lead to sulfate formation, suppressed dissolved oxygen content, and lower pH of the finished effluent.

DESIGN CRITERIA

Chemistry of Dechlorination by Sulfonation

Sulfur dioxide ($SO_2$) is a corrosive, nonflammable gas with, a characteristic pungent odor. At atmospheric temperature and pressure, it is a colorless vapor. When compressed and cooled, it forms a colorless liquid. Sulfur dioxide is supplied as liquefied gas under pressure in 100 or 150 pound containers and one-ton cylinders.

As an alternative to sulfur dioxide gas, various dry chemicals are available, which form sulfur dioxide in solution. These include sodium sulfite ($Na_2SO_3$), sodium metabisulfite ($Na_2S_2O_5$), sodium bisulfite ($NaHSO_3$), a 38 percent aqueous solution of sodium metabisulfite, and sodium thiosulfate ($Na_2S_2O_3$), among others (Lind, 1995).

When dissolved in water, chlorine hydrolyzes to form hypochlorous acid (HOCl) and hypochlorite loss ($OCl^-$) which, taken together, are referred to as "free chlorine." (Free, uncombined chlorine, $Cl_2$, is rarely found in wastewater since the conditions of formation are relatively extreme [Lind, 1995]). Once formed, the free chlorine reacts with natural organic matter in water and wastewater to form chlorinated organic compounds. The free chlorine also combines, with ammonia to form mono-, di-, and trichloramines in quantities dependent on the ratio of chlorine to ammonia nitrogen (Lind, 1995).

When either sulfur dioxide or sulfite salts are dissolved in water, aqueous sulfur compounds in the +4 oxidation state are produced, often notated S(IV) (Helz and Nweke, 1995). The S(IV) species, such as the sulfite ion ($SO3^{-2}$), reacts with both free and combined forms of chlorine, as illustrated in equations (1) and (2) (WEF, 1996);

$$SO_3^{-2} + HOCl \rightarrow SO_4^{-2} + Cl^- + H^+ \tag{1}$$

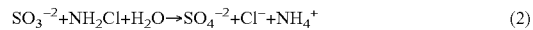

$$SO_3^{-2} + NH_2Cl + H_2O \rightarrow SO_4^{-2} + Cl^- + NH_4^+ \tag{2}$$

Since free chlorine and inorganic chloramines react rapidly with S(IV) (Helz, 1998), a short contact time of one to five minutes is considered to be sufficient; nevertheless, complete blending at the point of application is essential for effective dechlorination (WEF and ASCE, 1992).

Proper dosage is critical to produce non-detectable chlorine residual. On a mass basis, 0.9 parts sulfur dioxide (or 1.46 parts $NaHSO_3$ or 1.34 parts $Na_2S_2O_5$ is required to dechlorinate 1.0 part residual chlorine. In practice, approximately a one-to-one ratio is used (WEF, 1996). Dosing in excess must be avoided because excess sulfite can react with dissolved oxygen (four parts sulfite to one part oxygen) in the wastewater to produce sulfates, potentially leading to reduced dissolved oxygen concentrations and low pH levels in the finished effluent for high levels of overdose (WEF, 1996). Careful process control will help prevent overdosing.

Equipment for Gaseous Sulfonation

Equipment required for gaseous sulfonation using $SO_2$ is similar in design to that used for chlorination, except that the materials are chosen for their application-specific chemical resistance (WEF, 1996). The four basic components of the system include: sufficient gas supply with automatic switch-over between cylinders; a metering system, usually consisting of a vacuum regulator and a rotameter for feed rate control; one or more injectors with check valves; and a residual analyzer to measure and transmit a continuous signal proportional to the chlorine residual in the sample stream, in small concentrations, exposure to $SO_2$ can cause eye and throat irritation. In high concentrations, exposure can produce a suffocating effect caused by irritation to the upper respiratory tract. Therefore, facility design should include features for safe storage, handling, and use of sulfur dioxide. The chlorine and sulfur dioxide cylinders should be located in separate rooms and stored in a well-ventilated, temperature-controlled area so that their temperature never drops below 18 or exceeds 70 degrees Celsius. Gas leak detectors are necessary in the storage area and the sulfonator area. An emergency eyewash shower and self-contained breathing apparatus should also be provided. All personnel should receive emergency response training. Facilities with more than 1,000 pounds of $SO_2$ stored on-site must abide by the Process Management Safety Standard in the OSHA regulations (OSHA, 1998).

Effect of Temperature on Gas Withdrawal Rate

The room temperature where the gas supply is located should be maintained around 70 degrees F. to ensure optimal gas withdrawal rates (WEF, 1996). At this temperature, the maximum, safe sulfur dioxide gas withdrawal rate, is approximately 2 lb/hr for a 150 lb container, or 25 lb/hr for a ton container. Higher temperatures are required to achieve higher continuous gas withdrawal rates. Strip heaters or liquid baths may be used for this purpose.

Injector Selection

Proper selection of the injector is critical for proper system operation. The injector produces a vacuum that draws sulfur dioxide gas through the sulfonator. It then mixes the gas with dilution water supply and injects the solution into the wastewater. To properly size the injector, the back pressure on the injector at the point of application and the water supply pressure required at the injector must be determined. The injector can either be installed in a pipe or an open channel. As an alternative to the typical vacuum regulator with injector system, a chemical induction system, may be used to introduce the sulfur dioxide directly as a gas.

Control

At present, few options exist for reliable long-term measurement of sulfite salts or close-to-zero levels of residual chlorine in the finished effluent (ASCE and WEF, 1991). In recent practice, the only viable method, for continuous residual chlorine measurement has been the amperometric technique, but this suffers from loss of accurate calibration at low concentrations (Finger et al., 1985). Though some sources claim, to have developed process control methods employing oxidation reduction potential (ORP) as an effective stand-in for direct chlorine measurement (Bossard et al., 1995), other sources assert that ORP is an inappropriate technique for this purpose (WEF, 1996). For these reasons, control of dechlorination-particularly dechlorination to zero residual—has been problematic. Treatment plant operators have had to work around this limitation using various control strategies. One commonly used strategy is the use of a "zero-shifted" or "biased" analyzer (WEF, 1996; Nagel, 1994). In this scheme, a residual chlorine analyzer is used and a known concentration, X, of chlorine is added to the effluent sample to be analyzed, in this technique, the "zero" point is shifted by the value of X, and residual chlorine or sulfur dioxide can be inferred from the result of sample analysis.

Two types of control systems are often used for dechlorination (WEF, 1996). A "feed-back" control system can be used at treatment plants that are not required to dechlorinate their effluents to zero levels. With feed-back control, an analyzer measures the chlorine residual at a point downstream of the sulfur dioxide addition. This signal, along with flow rate data, is relayed back to the sulfonator and the dosage is automatically adjusted accordingly. Though there is a lag time between the injection point and the sample point, the lag is deemed to be minimal since the dechlorination reaction occurs almost instantaneously.

For treatment plants that must discharge a zero concentration or undetectable residual chlorine but are not equipped with biased or direct reading analyzers, feed-back control is typically not feasible (WEF, 1996). Therefore, such dechlorination systems often use a "feed-forward" control that measures the chlorine residual after disinfection but prior to the addition of sulfur dioxide. A mass flow signal is sent to the sulfonator from the in-line analyzer and the sulfur dioxide delivery rate is automatically calculated and adjusted to the ratio required for proper dechlorination of the effluent. Instrumentation combining feed forward control with biased analysis may provide an effective method, to dechlorinate the effluent to low-level residuals. Another useful design feature involves using an automated chlorine flush of the sample line (with sulfonator response temporarily locked). This procedure prevents the buildup of slime and algae in the sample line, thus eliminating chlorine demand in the line which can suppress residual chlorine analyzer results (Nagel, 1994).

Sample Calculation

Given: Peakflow=20 mgd. Measured chlorine residual is approximately 1.5 mg/L.

Calculate: Maximum dosage of sulfur dioxide needed per day. Assume a 1:1 ratio of $SO_2$ to $Cl_2$ Capacity=(flow rate)×($Cl_2$ residual)×(dosage ratio)= (20 mgd)×(1.5 mg/L $Cl_2$)×(8.34 lb/Mgal·mg/ L)×(1 mg/L $SO_2$ per mg/L $Cl_2$)=250 lb $SO_2$ per day maximum.

Using Sulfite Sails

Upon dissolution, sulfite salts produce the same sulfite ion as suffer dioxide gas (WEF, 1996). While the gas has the highest dechlorinating efficiency per net pound of the product added, many smaller facilities choose to use one of the sulfite salts because of the storage, handling, feeding, and safety problems associated with using gaseous sulfur dioxide on a large scale. Of all the sulfite salts available, sodium metabisulfite has the lowest addition rate required for dechlorination (Lind, 1995).

PERFORMANCE

Sulfonation has been widely considered effective for removal of chlorine, compounds in disinfected wastewater and reduction of toxicity for aquatic life. Nevertheless, two studies have suggested that disinfected/sulfonated wastewater poses a hazard to some sensitive aquatic species (Hall et al., 1982; Rein et al., 1992). Furthermore, one estimation of chlorine removal efficiency is from 87 to 98 percent (Helz and Nweke, 1995), leaving the actual residual chlorine following sulfonation above most regulatory limits.

Chloramines tend to be longer lived and less reactive than other chlorinated species in wastewater (Lind, 1995). While hydrophilic organic chloramines have been thought of as generally nontoxic, Helz and Nweke have found that the S(IV) fraction resistant to dechlorination may be composed of hydrophobic secondary amines and peptides, including chloramines, suggesting possible toxicity for aquatic organisms in receiving streams. The authors note that this fraction of S(IV)-resistant chlorine has been overlooked because the dechlorinating agent interferes with standard analytical methods for total chlorine (Helz and Nweke, 1995). Continued testing is underway to further characterize the dechlorination-resistant fraction and its effects on aquatic organisms (Helz, 1998).

OPERATION AND MAINTENANCE

Components of the pressure manifold—especially flexible connectors, valves, and the injector and solution system—are the most likely to need repair (WEF, 1996). In view of this, these components should be inspected at least every six months. Additionally, diaphragms and injector gaskets should be replaced every two years. The gasket should be replaced each time the joint is broken in a gasketed pressure connection. Asbestos fiber gaskets are not recommended because they often do not seal properly. Used gaskets should never be re-used. Springs should be replaced according to the manufacturer's instructions.

Spare parts—especially parts for the pressure manifold—and standby equipment, should, be kept an hand to prevent significant down time in the event of equipment problems. Because sulfonators are configured with the same components as chlorinators, some plant engineers tend to treat sulfonators as standby chlorinators (WEF, 1996), but this practice should be avoided. Chlorinators and sulfonators are composed, of different polymeric materials (sulfonators typically of PVC and chlorinators of ABS plastic), each chosen for application-specific chemical resistance. Use of non-chemical resistant materials with chlorine or sulfur dioxide gases can lead to equipment failure. Moreover, equipment misuse leading to accidental mixing of chlorine and sulfur dioxide gases can lead to an exothermic chemical reaction and equipment failure.

Water can be used to clean most component surfaces. For buildup of impurities or for stains, a dilute hydrochloric (muriatic) acid solution may be necessary (WEF, 1996). Following cleaning, the components must be thoroughly dried before they are reassembled. Drying is best done using compressed dry air or nitrogen."

To avoid storage of gaseous sulfur dioxide, as discussed above, many wastewater treatment facilities resort to liquid sodium bisulfite and sulfite solutions, which add additional sodium ions as shown in the sodium bisulfite and sodium metabisulfite equations below:

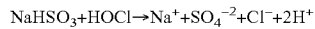

$NaHSO_3 + HOCl \rightarrow Na^+ + SO_4^{-2} + Cl^- + 2H^+$

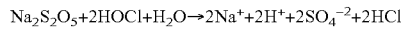

$Na_2S_2O_5 + 2HOCl + H_2O \rightarrow 2Na^+ + 2H^+ + 2SO_4^{-2} + 2HCl$

Smith, U.S. Pat. No. 6,464,885 issued Oct. 15, 2002 discloses a low pressure venturi system drawing in these liquid bisulfite and sulfite solutions, but does not address the sodium sail buildup Others have tried to use on-site generation of sulfurous acid for dechlorination to avoid the sulfur dioxide storage problem; see Jackson, U.S. Pat. No. 6,689,326 issued Feb. 10, 2004 using a sulfur generator for pressurize inline injection. This invention is relatively inefficient and does not overcome the chloride ion buildup for land application. Nor does it control pH for preventing gassing off of sulfur dioxide.

There thus remains a need for a method and solution to dechlorinate chlorinated waters without sodium, in a manner, which prevents gassing off of sulfur dioxide and offsets chlorides for land application. The method described below provides such a dechlorination method and solution.

SUMMARY OF THE INVENTION

Method

The present invention comprises a dechlorination method employing sulfurous acid and alkaline reagents to condition chlorinated waters and water streams for better chlorine removal.

The basic acid disassociation chemical reactions of $SO_2$ in water are:

$SO_2 + H_2O \Leftrightarrow H_2SO_3$ sulfurous acid

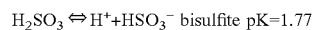

$H_2SO_3 \Leftrightarrow H^+ + HSO_3^-$ bisulfite pK=1.77

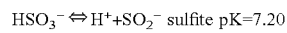

$HSO_3^- \Leftrightarrow H^+ + SO_2^-$ sulfite pK=7.20

This means 50% of the $SO_2$ is gas at pH 1.77 and 50% is $HSO_3^-$. In a similar manner, 50% is $HSO_3^-$ and 50% is $SO_3^{2-}$ at pH 7.2. Halfway between pH 7.2 and 1.77 and 1.77 is 5.43 as the pH where all of the sulfur exists as the $HSO_3^-$ form. At a pH of 10.86, all of the sulfur should exist as $SO_3^{2-}$.

Sulfurous acid components (free $SO_2$, sulfites, bisulfites, etc.) not only act as reducing agents to scavenge oxygen and chlorine, hut the bisulfites act as buffering agents to help maintain desired pH levels. They may be pH adjusted by an operator to provide dechlorination conditions as described below.

Specifically, the chlorine removal treatment method comprises first injecting sulfur dioxide ($SO_2$) into water or wastewater to provide $H^+$, $SO_2$, $SO_3^=$, $HSO_3^-$, dithionous acid ($H_2S_2O_4$), and other sulfur intermediate reduction products. Second adjusting the pH of the sulfur dioxide treated water with alkaline reagents to prevent gassing off of sulfur dioxide, and optimizing the presence of bisulfite and sulfite species to react with chlorine. Third, admixing the pH adjusted sulfur dioxide treated, water with chlorinated waters and wastewaters for dechlorinating by the bisulfites and sulfites.

With complex waters, such, as wastewater, numerous other components are present. Therefore the amount of sulfurous acid and pH adjustment required must be determined in the field by trial and error as bicarbonates, and other compounds materially affect the amount of sulfur dioxide and acid required. The pH adjustment to optimize the sulfite/bisulfite species is thus dependent upon the alkalinity of the waters to be dechlorinated and may only be approximated by a titration curve of the alkaline waters plotted against the addition of sulfurous acid. However, once the bicarbonates are neutralized, the titration curve generally shows the species present. Using a titration, curve of sulfurous acid with carbonic acid such as that shown, in FIG. 1, at a pH of at or above approximately 4, the sulfur dioxide specie is not present in significant amounts to gas off.

The type of alkaline reagent is selected based on the requirements of the end use. For example, sodium hydroxide, potassium hydroxide, magnesium hydroxide, ammonia, spent lime, and lime are typically used. The reagent selected is dependent upon the dechlorinated end use and reaction salts produced by their addition. For land application, preferably spent lime and/or lime are added to provide bivalent calcium to off-set the monovalent chlorides produced. If chlorides are not an issue and additional ammonia is required for land application, ammonia may also be used for elevating the pH for land application.

The method thus produces a pH adjusted sulfurous acid dechlorination solution, which won't gas off, is high in sulfites/bisulfites for chlorine removal, and salt balanced to off-set chlorides.

The present method has the advantage of rapid chemical dechlorination using a dechlorination solution, which doesn't contain sodium and includes calcium to off-set monovalent salts.

Although sulfur dioxide from tanks associated with, a contact mixer can be used to acidify the water and wastewater to be pretreated, a sulfurous acid generator, such as those produced by Harmon Systems International, LLC of Bakersfield, Calif., is preferred as they are designed to produce the $SO_2$ on demand and on an as needed basis. The $SO_2$ is immediately captured in an aqueous form as sulfurous acid ($H_2SO_3$) preventing harmful operator exposure. The sulfur dioxide is injected into the water or wastewater at a pH between approximately 1.5 and approximately 3.5, and then alkaline adjusted to optimise sulfite/bisulfite production. The Harmon sulfurous acid generator has the advantage of generating $SO_2$, as needed, avoiding the dangers of $SO_2$ tank storage. However, the main advantage in passing the water directly through the sulfurous acid generator is that it creates and introduces onsite $SO_2$ without adding other compounds or materials such as when using sodium meta-bisulfite and/or potassium meta bisulfite into the system, or additional acid compounds for pH lowering.

The above method provides a dechlorination treatment method and solution to remove chlorine and provide waters suitable for various soil regions, and soil conditions

DESCRIPTION OF THE DRAWINGS

FIG. 1 is a graph of a titration curve of sulfurous acid and carbonic acid.

DESCRIPTION OF THE ILLUSTRATED EMBODIMENTS

FIG. 1 is a graph of a titration curve of sulfurous acid and carbonic acid showing the distribution of sulfurous acid species $SO_2^{2-}$, $HSO_3^-$, and $SO_3^{2-}$ at different pH levels. At a pH of ~4, bisulfites and sulfites are predominantly present in solution so sulfur dioxide will not gas off. Use of lime provides $Ca^{+2}$ ions to off-set the chlorides as discussed above for land application.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

I claim:

1. A sulfurous acid dechlorination method of chlorinated waters to increase sulfites, prevent sulfur dioxide gassing off, and off-set monovalent chlorides in treated water for land application, comprising:
   (a) forming a concentrated sulfurous acid bisulfite/sulfite dechlorination solution by:
      (1) injecting sulfur dioxide ($SO_2$) into water or wastewater to provide $H^+$, $SO_2$, $SO_3^=$, $HSO_3^-$, dithionous acid ($H_2S_2O_4$), and other sulfur intermediate reduction products, via a sulfurous acid generator producing sulfur dioxide on an as needed basis to admix with water or wastewater forming a sulfur dioxide treated water or wastewater at a pH between approximately 1.5 and 3.5, and
      (2) adjusting the pH of the sulfur dioxide treated water or wastewater with alkaline reagents to above approximately 4 to convert the sulfur dioxide to bisulfite and sulfite species optimizing the presence of bisulfite and sulfite species for chlorine reduction, and
   (b) admixing the dechlorination solution with chlorinated waters and wastewaters for dechlorinating by the bisulfites and sulfites without sodium addition.

2. A sulfurous acid dechlorination method according to claim 1, wherein the alkaline reagents comprise spent lime and/or lime to provide bivalent calcium ions to off-set monovalent salts for land application.

3. A sulfurous acid dechlorination method according to claim 1, wherein the alkaline reagents comprise ammonia for land application, where chlorides are not an issue.

* * * * *